Oct. 28, 1969 W. VOGT ET AL 3,474,570
MECHANISM FOR EQUALIZING THE FORCE TRANSMISSION
Filed March 21, 1967 7 Sheets-Sheet 1

Fig. 25

# United States Patent Office 3,474,570
Patented Oct. 28, 1969

3,474,570
MECHANISM FOR EQUALIZING THE FORCE TRANSMISSION
Wilhelm Vogt, Kirchlindach, near Bern, Switzerland, and Werner Bahr, Hillscheid, near Koblenz, Germany, assignors to Arnold Klein Hillscheid, near Koblenz, Germany, a German firm
Filed Mar. 21, 1967, Ser. No. 624,767
Claims priority, application Germany, Mar. 21, 1966, K 58,783; Feb. 10, 1967, K 61,383
Int. Cl. G05f 11/00, 15/00
U.S. Cl. 49—200          15 Claims

ABSTRACT OF THE DISCLOSURE

Mechanism for transmitting force between a source having linear rate of change and a movable load structure having a changing force demand opposed to the force source includes a lever system forming a link between the source and the load structure for reversibly transmitting the force between the source and the load structure, a slide member having a guiding surface kinematically associated with the lever system and forming therewith a trigonometric-function relationship, whereby the effect of the transmitted force and the opposing force demand is substantially balanced during the entire movement of the load structure.

---

Our invention relates to device for continuous balancing or equalization of force applied to a force-absorbing or consuming load having a desirable and, especially an increasing force demand, the applied force being linearly decreasing. The source of the applied force can consist preferably of a stressed compression or tension spring which stores its maximum force in the stable or steady state thereof. This source of applied force is to be employed for supplying force-consumers having increasing force-requirement.

It is accordingly a primary objective of our invention to guide the course of the force transmission largely so that a state of equilibrium exists between force transmission and force consumption during the period in which the force is consumed or absorbed.

This course of the force transmission should be reversible, i.e. the process after the initial start-up of the force transmission should be usable in a suitable manner again for storing or accumulating the force.

The device of our invention is hereinafter described relative to a tilting or overhead door of a garage wherein a spring is employed as a force storing device or accumulator.

The smallest force is required initially for opening a tilting garage overhead door. As the garage door is progressively opened further, the force required to continue opening the door increases. The spring which acts as the force accumulator, however, quite contrarywise, supplies the greatest force at the instant the garage overhead door is initially opened and loses force as the door is being progressively opened further, so that as the door is being opened completely, when the greatest force is required to complete the opening thereof, a decreased force transmission is provided by the spring.

It is accordingly an object of our invention to provide device for maintaining the force requirement and the force transmission in equilibrium during the entire course of the force application when the door is being opened and closed. By this means, at each instant only a very small force will therefore be required to move the door.

A further object of our invention when employing the device thereof for an opening to a building, particularly for a garage overhead door, is to ensure that this opening is not narrowed or affected laterally by the device for equalizing the force transmission. Other objects are to provide such device which will require as little space as possible and, if possible, is installable above head level at or in the ceiling behind the opening to the building.

With the foregoing and other objects in view we provide, in accordance with our invention, a mechanism for transmitting force between a source having linear rate of change and a movable load structure having a changing force demand opposed to the force source including a lever system forming a link between the source and the load structure for reversibly transmitting the force between the source and the load structure, and a slide member having a guiding surface kinematically associated with the lever system and forming therewith a trigonometric-function relationship, whereby the effect of the transmitted force and the opposing force demand is substantially balanced during the entire movement of the load structure.

In accordance with further features of our invention, we provide mechanism for equalizing force transmission which comprises two different lever systems cooperating with one another by means of a slide displaceable therebetween, the lever ratio being determinable by the spring force, the spring path and the expansion stroke thereof from case to case in accordance with the existing technical requirement. The same applies to the determination of the goniometric function and therewith for the shape of the curve at at least one of the two effective boundary lines of the slide which arbitrarily afford every possibility for equalizing the effective forces.

Heretofore known devices for garage doors have relatively large and expensive tension springs or weights which are located on both sides of the tilting overhead garage door and are attached to both sides of the tilting door by means of bulky and complicated linkages. Those devices require much lateral space, and narrow the entrance to the garage. A considerable disadvantage of these known devices is that when one of the two springs stressed in tension fails or breaks, the door cannot be opened and closed or can be only with great difficulty. These springs furthermore lie free and unprotected in the interior of the garage so that when a spring is sprung, a person standing nearby can be injured. In accordance with a further feature of our invention, however, the device is located as much as possible in the direct vicinity of the pivot axis of the tilting overhead door since, thereby, only short movements can be transmitted to the tilting door. Consequently, only short paths are required for the springs and the transmission members so that the device according to our invention requires minimal space and is relatively easy to protect. It is thus possible to locate the device in a horizontal position and in a housing which can have such a limited height that it is substantially only as wide as the thickness of the garage door proper and is able to be easily located at the ceiling of the space behind the tilting door without reducing the size of the entrance to the garage in any manner.

In contrast to the known tilting overhead doors, the door of the invention in the instant application is movable completely freely without any lateral support by linkages or the like. In order to permit this free movement with the aid of short operating paths within the device, a considerable force source is required. This source can be of any type; however, it is preferable to employ helical springs for storing the force and, more particularly, helical springs which are stressed in compression. The helical springs are located in two preferably tubular supporting housings separated from one another and, in the case where the springs are of the compression type, movable opposite to one another. Thus, for the door under consideration, the necessary prestressing of the spring whose outer ends are supported against pressure plates, is very easily adjusted by suitable tension screws which are mounted at both ends of the support housing so that they are readily accessible. By means of this relatively easy adjustability, it is possible to employ the very same device for tilting overhead doors of the most varied dimensions and weights.

At each of the two support housings, a universal joint is attached, respectively, acting on a lever system in which the levers are mounted relative to one another in mirror-image relationship, the fixed pivot point of each lever being located at the housing. A slide device, preferably in the shape of a roller is located at the free end of these levers, and slides over guiding rails of a slide member when the levers are actuated and thereby moves the slide member. The longitudinal arrangement of the arms of the transmission levers as well as the angle relationship of the guide rails to one another depend upon the force necessary for moving the tilting door. The guide rails can have a curved shape depending upon the force requirement. For reasons based upon manufacturing techniques, it is best to select such a relationship of the lever arms and such an angle relationship of the guide rails to one another that the guide rails form a straight line. This is particularly of significance if the guide rails have to absorb large forces and must therefore be reinforced. Both guide rails border on the body constructed as the slide member which transmits the action of the force to the door and which is guided within the housing slidingly in rails or grooves. On the side of the slide member located opposite the guide rails, two pressure transmitting elements are located, spaced as much as possible from one another, which directly act on the device for opening the tilting overhead door. The opening member proper consists of a short lever arm which is articulatingly connected at its fixed end to the housing. The free end of the short lever faces the slide member and is provided with a roller which rolls on the pressure transmission element of the slide member. Consequently, in the opening operation, the location of the lever is changed from the horizontal to the vertical position while the overhead tilting door is moved from the vertical to the horizontal position.

An additional lower arm is secured to the lever, preferably at a right angle thereto, and guides the tilting door proper. A bell crank is formed thereby which balances the goniometric functions of both lever arms, i.e. the force requirement at the pressure transmission elements is constant.

An constant adjustment of the turning movement of the door in a particular location presupposes that the substantially linear characteristic of the spring force is changed in such a way that the pressure of the pressure-transmitting element against the rollers at the lever is always of such value that the turning moment of the door is counterbalanced. Starting from the required balancing force, it follows that the force to be transmitted from the vertical surface of the pressure transmitting element to the roller at the free arm of the short lever, is constant, because the turning moment opening the door increases sinusoidally, whereby the turning moment transmitted through the rollers to the door with constant pressure of the surfaces of the pressure-transmitting element against the rollers also increases correspondingly according to a sine function. Consequently, when transmitting the spring force through the lever at the universal joint, the rollers and the guiding ledges to the slide member, the linearly increasing or decreasing spring force is transformed to a constant force. The device of our invention is dimensioned, for example, so that the levers at the universal joint are pivotable from an inner terminal position inwardly inclined about 15° with respect to the direction of sliding of the sliding member, to an oppositely disposed terminal position outwardly inclined about 15° and located symmetrically to the inner terminal position.

In the embodiment of our invention described and illustrated herein, because it is particularly simple, a spring which is either stressed in compression or tension has been chosen as the source of the force. Of course, other sources of force, such as are known for example in hydraulic or pneumatic engineering, may be employed for operating devices with balanced force transmission in accordance with our invention.

The embodiment of the invention is furthermore described with regard to actuating the opening and closing of a tilting overhead garage door.

Other features which are considered as characteristic for the invention are set forth in the appended claims.

Although the invention is illustrated and described herein as embodied in mechanism for equalizing the force transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Referring now to the drawings, there is shown in FIGS. 1 to 7 and 19 a compression spring 1 which acts as force storer or accumulator. This compression spring 1 is located, in the illustrated embodiment, in a tubular support housing that is divided in two. The spring force is regulatable exteriorly by tensioning screws 4 at both ends thereof for respectively producing the desired compressive stress in the springs. The screws 4 engage with pressure plates 5 and are threaded in screw holders 6.

A universal joint 7 is provided on both housing portions 2 and 3. The joint 7 serves to transmit the increased force in the compression spring 1 to two lever arms 8 which are mounted for pivotal movement about the pivots 9. The pivot pins 9 are secured to a housing box 10 which contains the entire device of our invention therewithin. The free ends of the lever arms 8 are provided with rollers 11 rotatably mounted on respective pins carried at the free ends of the arms 8. The rollers 11 have a profiled edge 13, similar to that of a railroad car wheel which, upon movement of the rollers 11, slidingly rolls along respective guiding rails 14.

Figure 10:
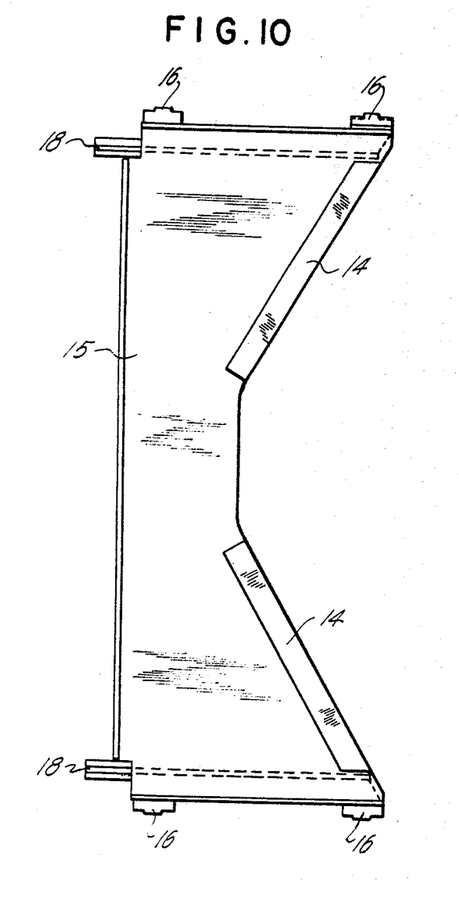
FIGS. 10, 11 and 12 are plan, side and elevational views of the slide member forming part of the invention.
Figure 11:
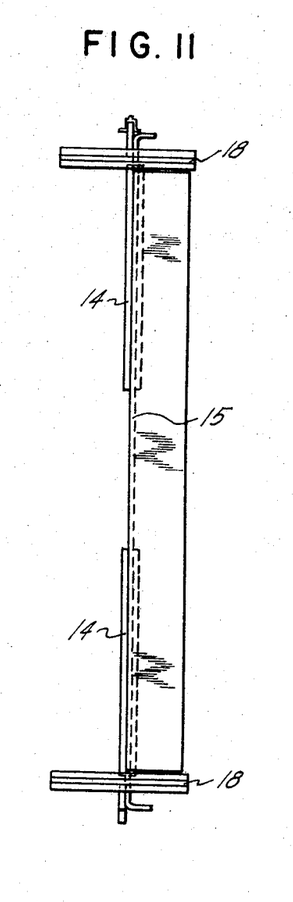
Figure 12:
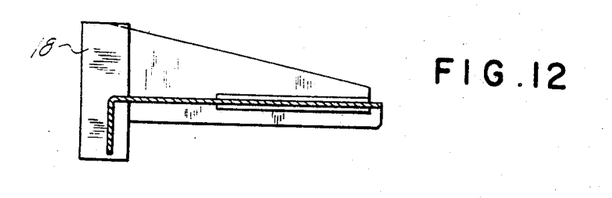

These guiding rails 14 represent the controlling edge of the slide member 15 for the movement function and are reinforced because of the heavy mechanical stresses applied thereto. The slide member 15 is shown in greater detail in FIGS. 10 to 12. The slide member 15 may be stamped out of sheet metal and is provided at both lateral extremities thereof with cam-shaped slides 16 which permit the slide member 15 to be slidably moved in the guide slots 17 shown, for example, in FIG. 2. The slide member 15 is provided with pressure transmitting elements 18 on the edge thereof located opposite the guiding ridges 14. The pressure-transmitting elements 18 are in turn provided with a roller-engaging edge and reinforced so that they are able to transmit the motion of the slide member 15, produced by the increased pressure applied thereto, to the rollers 19 of a bell crank 21, as shown in FIGS. 1, 2 and 16 to 18.

Figures 1, 2:
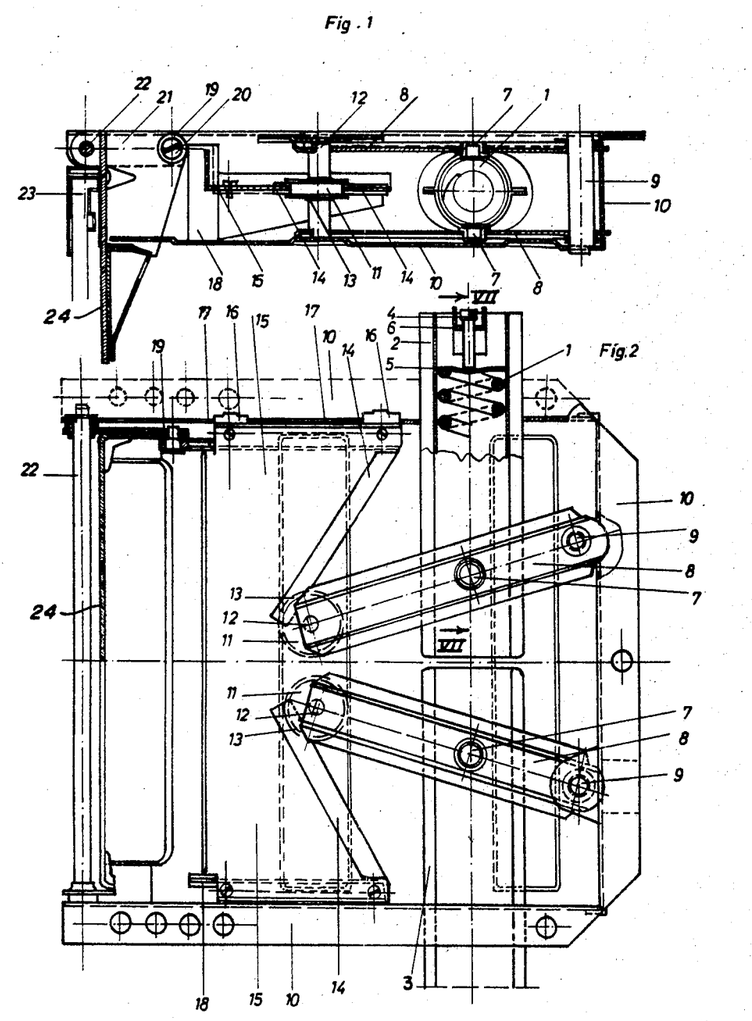
FIG. 1 is a longitudinal sectional view of the device for balancing force transmission of our invention as employed with a tilting overhead garage door, shown in closed condition.
FIG. 2 is a top plan view of FIG. 1.
Figure 16:
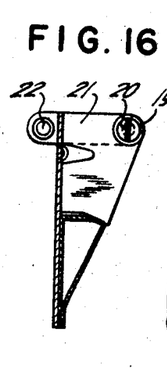
FIGS. 16, 17 and 18 are a sectional view and elevational views of the extremities, respectively, of part of our invention shown at the left-hand side of FIG. 1.
Figure 17:
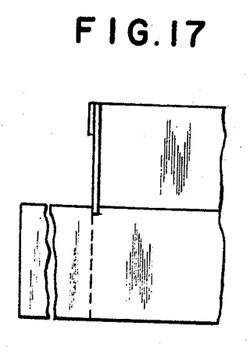
Figure 18:
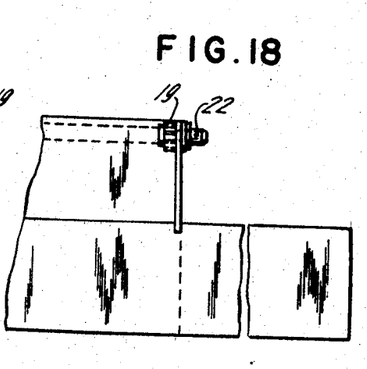

As seen, for example, in FIG. 16, the rollers 19 are rotatably mounted with the pins 20 at the free ends of the bell cranks 21. The bell cranks 21 are themselves rotatably mounted on a shaft 22 secured to the housing box 10. A rigid arm 24 extending perpendicularly downwardly, as shown in FIG. 1, for example, is fixed to the bell cranks 21. The garage door 23 is secured to the rigid arm 24 so that the door 23 is opened due to the forward movement; i.e. in a direction toward the left-hand side of FIGS. 3 and 4 for example, of the slide member 15.

Figure 13:
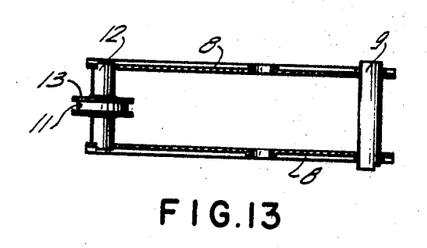
FIGS. 13, 14 and 15 are respective elevational, side and plan views of the transmision lever forming part of the invention.
Figure 14:
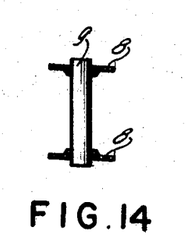

As shown in FIGS. 13 and 14; the two lever arms 8 belonging to the universal joint 7 are made of two parts.

Figure 15:
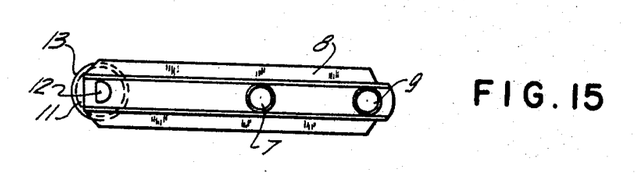

FIG. 15 shows a top plan view of the lever arm 8 having a fixed pivot point at the pins 9.

The universal joints 7, which are secured to the tubular support housings 2, 3, follow the movement of the housings 2, 3 and transmit the force to the pins 12 so that the rollers 11 roll along the guide rails 14 and thereby move the slide member 15. The linear force action delivered by the compression spring 1 is adjusted in the characteristic thereof in this manner with the aid of the lever 8 and the guide rails 14 to the decreasing force. By the cooperation of the compression spring 1 with the universal joint 7 and the lever arm 8 which moves the slide member 15, the force at the pressure transmission element 18 is constantly transmitted through the lever 21 to the tilting garage overhead door.

FIGS. 3 to 6 show different stages in the opening and closing movements of the door 23. It is recognizable from these figures as to how the tubular members 2, 3 of the support housing move away from one another during the opening movement of the door due to the expansion of the spring 1 and again, move close to one another when the door is being closed whereby the spring 1 is compressed. Moreover, there is clearly seen in FIGS. 3 to 6 the rolling contact between the rollers 11 at the free end of the lever arms 8 and the guide rails 14.

Figures 3, 4, 5, 6, 8, 19:
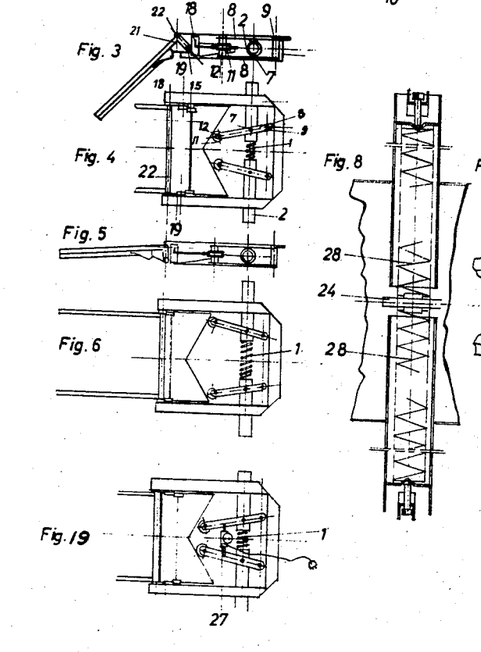
FIGS. 3 and 4 are considerably reduced views of FIGS. 1 and 2 respectively, showing the garage door in partly opened condition.
FIGS. 5 and 6 are views corresponding to FIGS. 3 and 4, respectively, with the garage door in fully opened condition.
FIG. 8 shows a modified portion of the embodiment of FIG. 2 much reduced in size and having separate compression springs.
FIG. 19 is a much reduced view corresponding to that of FIG. 2 provided additionally with a built-in, automatic release mechanism.
Figure 7:
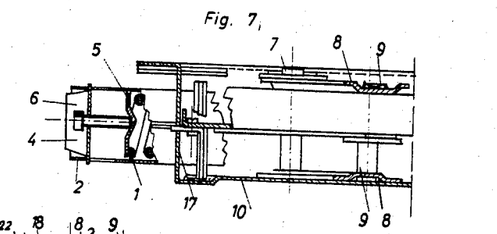
FIG. 7 is a sectional view of FIG. 2 taken along the line VII—VII in the direction of the arrows.

In FIG. 8, instead of a single spring passing through both tubular housings 2, 3 as in the embodiment of FIG. 2, the compression spring is subdivided in two so that the adjacent ends of the thus provided two compression springs cooperate at a coupling member 24. The modification of a divided compression spring 1 has an advantage over the individual spring which passes through both housings 2, 3 as in FIG. 2 in that possible disturbing deflections or deviations of the single-type compression spring is thus avoided.

Figure 9:
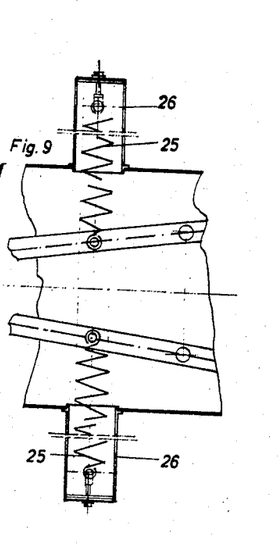
FIG. 9 is a further modification of FIG. 8 showing two springs acting in tension.

In FIG. 9, instead of compression springs, there is employed a two-part tension spring. In this modification, the housing for the tension springs 25 are rigidly connected to the box-shaped housing 10. Otherwise, the mechanical components shown in the preceding figures remain unchanged.

In FIG. 19, there is shown an additional initial force source 27, such as a reversible electric motor, for example, which institutes an automatic opening and closing of the tilting overhead garage door. Only a minimal force, as compared to the entire device, is required therefor. This device is advantageously combined with a suitable curved shape of the pressure transmission elements 18. As shown in the figures, it is very easily possible to adjust the prestressing of the springs 1 to any desired value with the aid of the regulating screws 4. This is therefore of particular significance because one and the same device is adjustable for the most varied embodiments of tilting overhead garage doors so that several different types of this device need not be manufactured or held in stock.

In the embodiment of FIGS. 22 to 26 there is provided a compression spring 1 as force accumulator. This compression spring 1 is located in a divided housing 2, 3 wherein the compression spring is supported so that it can be regulated from the outside with the aid of adjusting screws 4 at both ends thereof.

Figure 26:
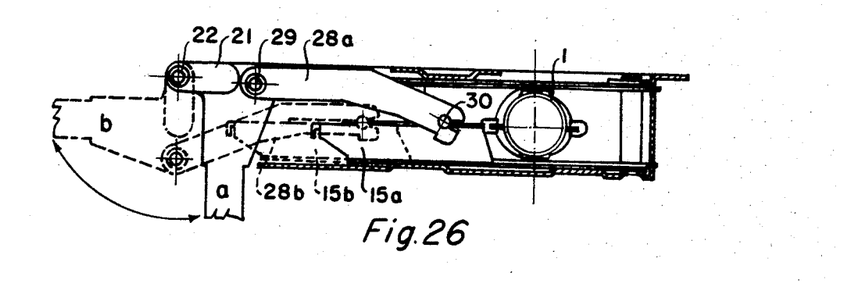

During the opening operation of the door, the compression spring 1 is relieved so that both support housings 2, 3 are removed from one another as represented by the dotted line position 26 thereof in FIG. 26.

A universal joint 7 is mounted on both housing portions 2 and 3 and serves for transmitting the force stored in the compression spring 1 to two lever arms 8. The lever arms 8 are pivotally mounted at pivot points 9 on the housing box 10. The free ends of the lever arms 8 are provided with rollers 11 which are rotatably mounted on pins 12. The rollers 11 are provided with a profiled rim so as to slidingly roll along the guide rails 14.

The guide rails 14 represent the controlling edge of the slide member 15 for the moving function from which there extends the force proper applied to the bell crank 21 that is secured to the door.

Figure 25:
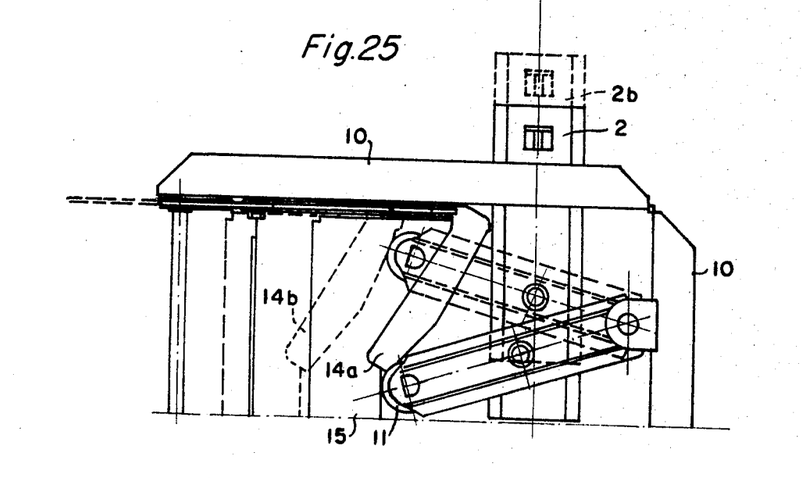
FIGS. 25 and 26 are views respectively of FIGS. 22 and 23 showing the positions of various components by solid lines in the closed condition of the door and by dotted lines in the open condition of the door.

The bell crank 21 is connected to the slide member 15, in accordance with another feature of our invention, by another bell crank 28 through bearings 29 and 30 so that the bell crank 28 can execute a movement that is friction-free as much as possible during the opening or closing operation of the door. This movement is represented in FIGS. 25 and 26 by identifying the door 23 in the solid line closed position thereof as $a$ and in the dotted line open position thereof as $b$. Accordingly, the corresponding positions of the bell crank 28 and the slide member 15 are identified as 28$a$, 28$b$ and 15$a$, 15$b$ respectively. This is also true for the support housing 2 which, as aforementioned, is identified as 2$a$ in the dotted line position thereof when the opening operation of the door is completed.

Figures 22, 23:
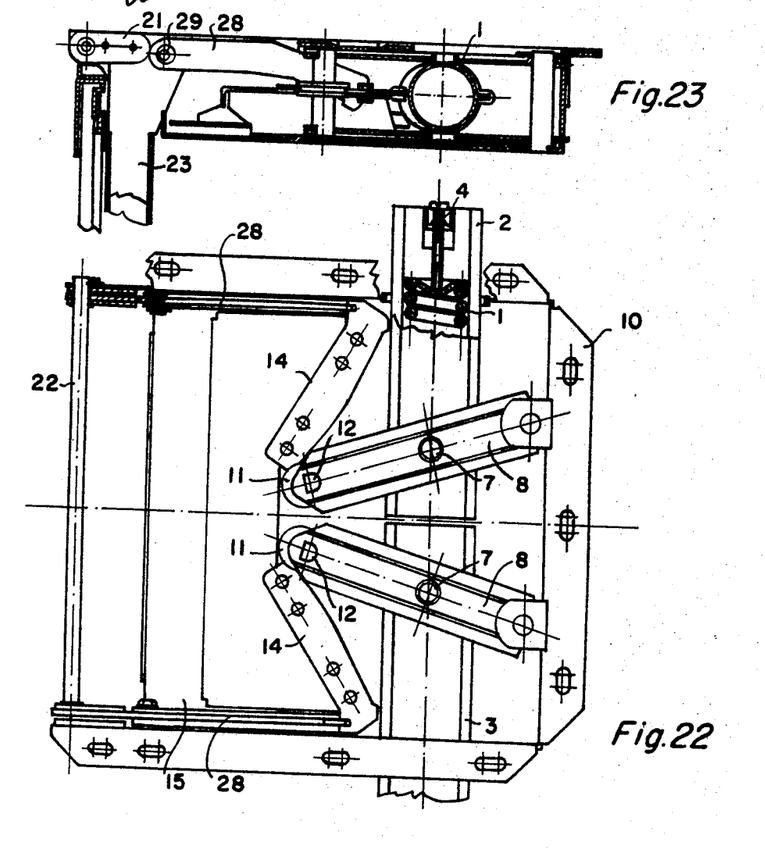
FIGS. 22 and 23 are views corresponding to FIGS. 2 and 1 respectively of another embodiment of the invention.
Figure 24:
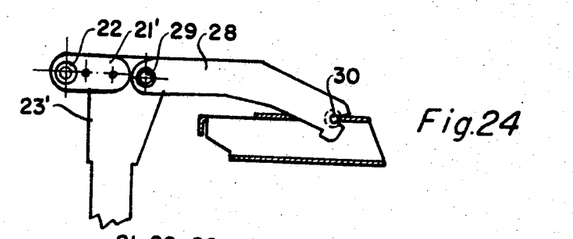
FIG. 24 is a view of a fragment of FIG. 23.

It is apparent from FIG. 22 that the guide rails 14 made of especially wear-resistant material are screwed or bolted to the slide member 15 which is made of ordinary sheet metal.

The guide rails 14 have a guiding edge of such curved shape that the course of the force transmission imparts a suitable initial stress to the opening operation and a corresponding relieving stress to the closing operation.

Figure 20:
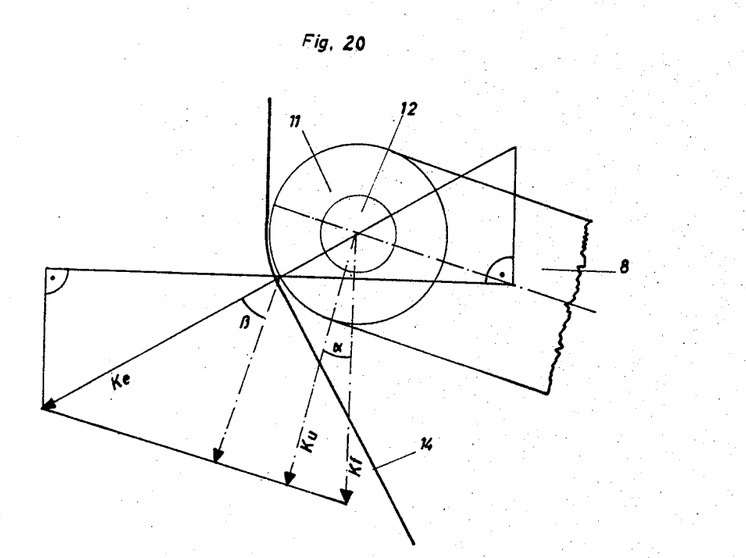
FIG. 20 is a diagramatic view of the terminal position of a lever showing the component forces.

In FIG. 20 there are shown the relationships for the inner terminal position of one of the levers 8. Since the lever arm ratio between the pin 9 and the axis of the roller 12 or ball bearing always remains the same, a force K$f$ proportional to the spring force will act at the bearing location of the roller 12 is a direction parallel to the spring axis. A force K$u$ equal to K$f$ cos$\alpha$ acts tangentially to the circular motion of the pivot 12 on the lever 8 as it turns about the pivot pin 9. Due to the pivotal friction-free mounting of the roller 11, a force K$e$ can be transmitted from this roller 11 to the inclined surface of the guide rail 14 only perpendicularly to the surface. Since the direction of this force K$e$ is always the same, this force K$e$ must always be constant and:

$$Ke = Ku/_{\cos\beta} = Kf \cos\alpha/_{\cos\beta}$$

Whereas is has been assumed in all of the heretofore disclosed embodiments that a single device according to our invention is located in the middle of the door, naturally two or more devices of the invention can be located suitably spaced from one another and synchronized with one another for especially wide doors.

Figure 21:
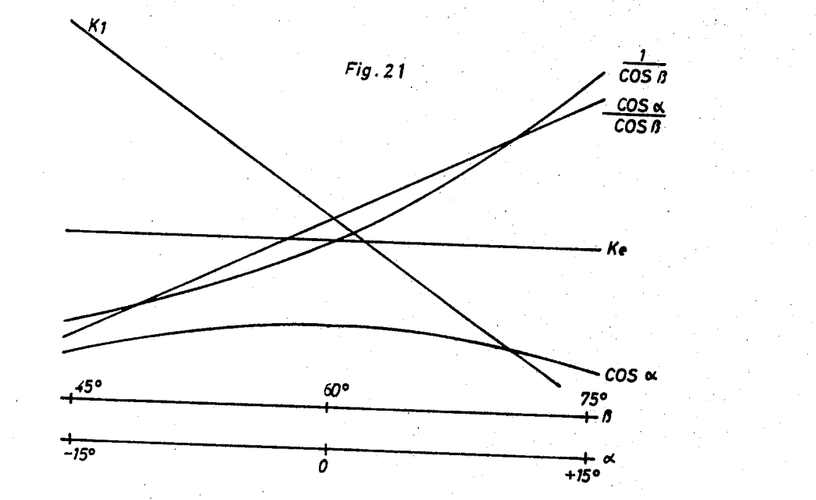
FIG. 21 is a graph of the individual sinusoidal functions.

In FIG. 21, the individual trigonometric functions are illustrated. For example, there is shown that for the inner terminal position of the lever 8 illustrated in FIG. 20 the angle $\beta$ is equal to 45°. If the lever 8 is pivoted 30° to its outer terminal position, the angle $\beta$ then changes by 30° and is equal to 75° in the outer terminal position. For this range of the angle $\beta$, the course of the spring force or the force K$f$ proportional thereto is shown. The force K$f$ decreases linearly from a maximum at the inner terminal position of the lever 8 at the universal joint 7 to a minimum at the outer terminal position of the lever 8. The function cos$\alpha$ is represented within this range of the angle $\beta$ by a flat upwardly arched or convex curve. The function $1/_{\cos\beta}$ forms a progressively increasing curve within the given range of angle $\beta$. The superimposed curve $\cos\alpha/_{\cos\beta}$ is an increasing straight line which provides a compensation of the available spring force K$f$ to a constant force K$e$. Thus, a practically total compensation of the turning moment that closes the door is rendered possible by the device of our invention which is mechanically simple and relatively inexpensive to produce. It is above all desired that a given turning moment for closing the door be applied to the door is the closed position thereof, which is effected by the inclined surface of the pressure transmission elements 18 of the slide member 15. Moreover, the door can clearly remain in open position, if a suitable rest is provided therefor.

Naturally, the device of our invention can also have different constructions depending upon the purposes for which it is to be used. It is especially possible to achieve the transformation of the spring characteristic to a characteristic suitable for adjusting or balancing the tilting moment by other means, particularly by varying the control source. There can also be provided, for example, rest recesses for determining the open position and the closed position of the door on the pressure transmission elements or guiding rails.

We claim:

1. In mechanism for transmitting a continuous balancing force between a force source having a linear rate of change and a load structure pivotable about a pivot axis in one rotary direction with increasing force demand opposed to the force source and pivotable about the pivot axis in the other rotary direction with restoration of force to the source, the force source being stressed spring means having an axis disposed substantially parallel to the load structure pivot axis, a slide member in force-transmitting engagement with the load structure, said slide member having a cam guiding surface extending in a direction substantially parallel to the spring axis, and a pair of lever arms engaged by said spring means and engaging the guiding surface of said slide member, said lever arms being displacable toward and away from one another along said guiding surface as the load structure is pivoted in either rotary direction about the pivot axis so as to continuously transmit a balancing force between the spring means and the load structure in all pivoted positions of the load structure.

2. Mechanism according to claim 1, wherein said spring means is pivotally connected by a universal joint with said lever means for imparting motion to said lever means.

3. Mechanism according to claim 1, wherein said slide member is formed of sheet metal and includes an attached member having said guiding surface, said attached member being formed of wear-resistant material.

4. Mechanism according to claim 1, wherein said load structure is an overhead garage door, and including an exterior housing box having an overall height corresponding to the thickness of the door.

5. Mechanism according to claim 1, wherein said spring means comprises tubular supporting housing means, a compression spring means located in said housing substantially coaxial therewith, said housing means being universally connected with said lever means and being movable in response to the pressure exerted by said compression spring for moving said lever means.

6. Mechanism according to claim 1, wherein said spring means comprises tubular supporting housing means, a tension spring means located in said supporting housing substantially coaxial therewith, said supporting housing means being universally connected with said lever means, and including an exterior housing box for the mechanism, said supporting housing means being rigidly connected to said exterior housing box, and said spring means being in engagement with said lever means for moving the same in response to the tension exerted by said tension spring.

7. Mechanism according to claim 1, wherein said load structure is an overhead garage door, and including a closed exterior housing box containing all of the force-transmitting components of the mechanism, said exterior housing box being disposed at the top of said door whereby the width of the door opening is free of obstruction.

8. Mechanism according to claim 1, wherein said spring means includes a supporting tubular housing extending transversely to and engaging with said lever means, said spring means having free ends, and adjustment means located at said free ends of said spring means for tensioning said spring means.

9. Mechanism according to claim 8, wherein said adjustment means comprises respective tensioning screws located at said free ends of said spring means and accessible from the outside thereof, a respective screw holder mounted at said free ends of said spring means for supporting said screws, and respective pressure plates located between said screws and the free ends of said spring means.

10. Mechanism according to claim 1, wherein said levers are disposed alongside one another in mirror-image relationship, said force source being connected by universal joint means with said levers for imparting a force thereto, said levers having respective free ends engageable with said guiding surface of said slide member and linearly movable therealong through an angle formed therebetween, said slide member having pressure transmission elements, and bell crank means having a free end secured to said load structure, said bell crank means being engageable by said pressure transmission elements for moving said load structure.

11. Mechanism according to claim 10, wherein said levers are pivotable through an angle of 30° between positions in which they define angles of 45° and 75° with said guiding surface of said slide member, said force source comprising a spring connected for universal movement with said levers whereby an increase in said angle corresponds to decrease in the force of said spring.

12. Mechanism according to claim 10, wherein said pressure-transmission elements comprise tilting levers having bearing means at the ends thereof connecting said slide member to said bell crank means thereby.

13. Mechanism according to claim 12, wherein said load structure is a tilting overhead door and wherein said guiding surface of said slide member is curved at at least one end thereof so that the force transmission imparts an increased stress when the door is being raised and a released stress when the door is being lowered.

14. Mechanism according to claim 1, including a reversible additional force source operatively connected to said load structure for applying a starting force thereto to meet the initial force demand thereof and for restoring the force storage of said transmitting force source, said additional source having a force output that is small relative to the force output of said transmitting force source for meeting the force demand of said load structure.

15. Mechanism according to claim 14, wherein said reversible additional force is a reversible electric motor.

References Cited

UNITED STATES PATENTS

| | | | |
|---|---|---|---|
| 2,195,875 | 4/1940 | Pixley | 49—206 |
| 2,279,992 | 4/1942 | Jackson et al. | 49—386 X |
| 2,603,842 | 7/1952 | Robinson | 49—206 X |
| 2,610,849 | 9/1952 | Young | 49—379 X |
| 3,089,267 | 5/1963 | Wooden | 49—386 X |
| 3,308,581 | 3/1967 | Gustavsson | 49—206 |

FOREIGN PATENTS 835,384   5/1960   Great Britain.

DENNIS L. TAYLOR, Primary Examiner

U.S. Cl. X.R.

49—203